(12) United States Patent
Sahni et al.

(10) Patent No.: US 11,384,739 B2
(45) Date of Patent: Jul. 12, 2022

(54) ROBOTIC SYSTEM FOR WIND TURBINE AIRFOIL MAINTENANCE

(71) Applicants: Ranbir Sahni, Carolina, CA (US); Mahdi Yoozbashizadeh, Huntington Beach, CA (US); Aaron Wahlstrom, Tehachapi, CA (US); Travaughn Montgomery, Los Angeles, CA (US); Berok Khoshnevis, Marina Del Rey, CA (US)

(72) Inventors: Ranbir Sahni, Carolina, CA (US); Mahdi Yoozbashizadeh, Huntington Beach, CA (US); Aaron Wahlstrom, Tehachapi, CA (US); Travaughn Montgomery, Los Angeles, CA (US); Berok Khoshnevis, Marina Del Rey, CA (US)

( * ) Notice: Subject to any disclaimer, the term of this patent is extended or adjusted under 35 U.S.C. 154(b) by 0 days.

(21) Appl. No.: 16/872,164

(22) Filed: May 11, 2020

(65) Prior Publication Data

US 2020/0362827 A1    Nov. 19, 2020

Related U.S. Application Data

(60) Provisional application No. 62/847,510, filed on May 14, 2019.

(51) Int. Cl.
*F03D 80/50* (2016.01)
*B23P 6/00* (2006.01)
*F03D 80/55* (2016.01)

(52) U.S. Cl.
CPC .............. *F03D 80/50* (2016.05); *B23P 6/002* (2013.01); *F03D 80/55* (2016.05); *F05B 2230/80* (2013.01); *F05B 2230/90* (2013.01)

(58) Field of Classification Search
CPC ............ F03D 80/50–55; F05B 2230/80; F05B 2230/90; F05B 2230/31; B64F 5/30; B64F 5/40; B23P 6/002; B23Q 9/0007; B23Q 9/02; Y10T 29/53983; B65H 35/0013
See application file for complete search history.

(56) References Cited

U.S. PATENT DOCUMENTS 9,221,506 B1 * 12/2015 Georgeson ............... G05D 1/00
2003/0213187 A1 * 11/2003 Trpkovski ............ B29C 63/024
52/105

(Continued)

*Primary Examiner* — Matthew P Travers
(74) *Attorney, Agent, or Firm* — Fulwider Patton LLP

(57) ABSTRACT

An automated wind turbine servicing system that includes a rover, and uses an active electro-mechanical gripping roller system to attach to a horizontally positioned airfoil and navigate along it in order to clean, inspect, service, or otherwise maintain the wind turbine airfoil. An electromechanical compression system adapts to various turbine airfoil profiles. Once secured to the airfoil, the rover activates a drive system that propels the rover along the airfoil as it travels along an upper edge, using wind pressure, the rover wheels' frictional adherence to the airfoil, and gravity to assist in coupling the rover to the airfoil. The rover, which preferably includes a robotic arm, is able to utilize multiple tools to perform various tasks such as inspecting, cleaning, sanding, repairing, painting and laying leading edge protection tape as well as vortex generators on the surface of the airfoil.

16 Claims, 12 Drawing Sheets

(56) References Cited

U.S. PATENT DOCUMENTS

| | | | |
|---|---|---|---|
| 2010/0018551 A1* | 1/2010 | Gallegos | B08B 3/024 134/6 |
| 2011/0031066 A1* | 2/2011 | Liu | F03D 80/50 182/129 |
| 2011/0127109 A1* | 6/2011 | Teichert | F03D 80/50 182/19 |
| 2011/0318496 A1* | 12/2011 | Jensen | F03D 80/50 427/427.3 |
| 2012/0003089 A1* | 1/2012 | Byreddy | B08B 1/008 416/61 |
| 2012/0103705 A1* | 5/2012 | Schlee | F03D 80/50 180/14.1 |
| 2013/0024067 A1* | 1/2013 | Troy | B64F 5/30 701/36 |
| 2014/0067185 A1* | 3/2014 | Tralshawala | G01R 33/12 701/24 |
| 2014/0182479 A1* | 7/2014 | Hafenrichter | B64F 5/60 105/30 |
| 2015/0135459 A1* | 5/2015 | Lee | F03D 80/55 15/246 |
| 2015/0267688 A1* | 9/2015 | Krampe | F03D 80/50 701/2 |
| 2016/0184869 A1* | 6/2016 | Masia Perales | B08B 3/022 134/56 R |
| 2016/0368134 A1* | 12/2016 | Hafenrichter | G01N 27/90 |
| 2017/0136550 A1* | 5/2017 | Aoyagi | B23Q 5/04 |
| 2018/0087490 A1* | 3/2018 | Fraughton | B08B 3/024 |
| 2019/0176281 A1* | 6/2019 | Hafenrichter | B64F 5/60 |
| 2019/0249649 A1* | 8/2019 | Bjerge | F03D 80/55 |
| 2019/0283821 A1* | 9/2019 | Georgeson | F03D 80/55 |
| 2019/0316568 A1* | 10/2019 | Nielsen | F03D 80/50 |
| 2019/0338759 A1* | 11/2019 | Badger | B29C 73/04 |
| 2020/0025176 A1* | 1/2020 | Georgeson | G01M 5/0016 |
| 2020/0063717 A1* | 2/2020 | Georgeson | G01N 29/225 |
| 2020/0158091 A1* | 5/2020 | Sen | F03D 80/50 |
| 2020/0158094 A1* | 5/2020 | Danko | F03D 80/50 |
| 2020/0166938 A1* | 5/2020 | Hafenrichter | B64C 27/37 |
| 2020/0238324 A1* | 7/2020 | Laurberg | B05B 13/0431 |
| 2020/0318619 A1* | 10/2020 | Laurberg | B25J 11/008 |
| 2020/0325878 A1* | 10/2020 | Danko | B62D 57/024 |
| 2021/0095642 A1* | 4/2021 | Cieslak | G01M 13/00 |

* cited by examiner

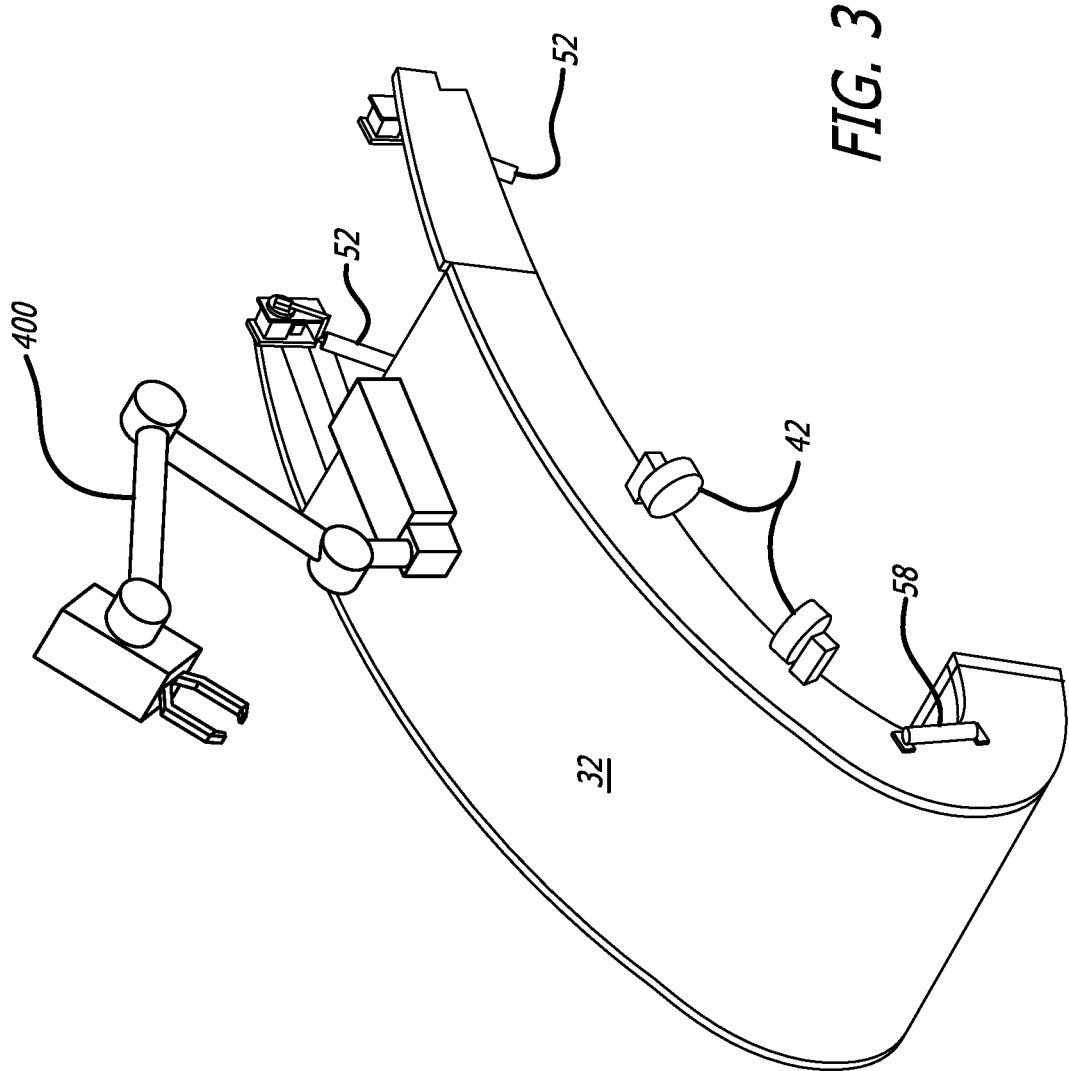

ROBOTIC SYSTEM FOR WIND TURBINE AIRFOIL MAINTENANCE

CROSS-REFERENCES TO RELATED APPLICATIONS

This application claims priority from U.S. Provisional Patent Application No. 62/847,510, filed May 14, 2019, the content of which is fully incorporated herein by reference.

BACKGROUND

It is known that the efficiency of wind turbines can be improved by cleaning, repairing, and improving the surface characteristics of the airfoils of the turbine, sometimes referred to as the blades. However, such servicing of the airfoils can be challenging, time consuming and occasionally dangerous to those technicians that must work on and inspect the devices. To service an airfoil, the turbine is stopped and the airfoil to be serviced is positioned at a 6 o'clock position, i.e. vertically downward. A worker is brought to the airfoil and uses various techniques to inspect, clean, repair and apply films or tape to the airfoil. Workers sometimes operate from a crane basket, or are suspended in a carrier by cables, or lowered from cables or ropes to the surface of the airfoil. Once the service is performed, the turbine is advanced until the next airfoil is in the vertical position, and the process is repeated until all the airfoils are serviced. The present invention seeks to overcome the shortcomings of the current state of the art.

SUMMARY OF THE INVENTION

The present invention is an automated wind turbine servicing system that includes a rover with a propulsion system to move the rover across a horizontally positioned turbine airfoil. The rover carries tools that can be used to clean, inspect, paint, and/or repair the surface of the airfoil. In a preferred embodiment, the rover is equipped with an electromechanical balancing system that levels the rover as it rolls along the upper edge of the airfoil, where this balancing system allows the rover to adapt to various turbine airfoil profiles and sizes. The rover preferably operates on a horizontal airfoil to utilize gravity in stabilizing its position as the rover moves along the airfoil. Once raised to the airfoil, the rover activates a drive system that propels the rover along the airfoil as it travels along the upper edge, using the rover wheels' frictional adherence to the airfoil and gravity to permit secure movement on the airfoil. A cable may be attached to the rover to power the rover and to connect the rover to a winch that lifts the rover to the airfoil. The rover includes a mechanical track system that allows tools to move along the rover's span to perform multiple functions on the airfoil such as inspecting, cleaning, sanding, repairing, painting and laying leading edge protection tape as well as vortex generators on the surface of the airfoil.

In various embodiments, the rover includes various tools to service the wind turbine and improve its performance or conduct repairs. For example, the rover may carry at least one laser tool that focuses a laser beam over the surface contour of the airfoil to remove contaminants, dust, bugs, debris, or any other undesirable material from the airfoil's surface. A laser sweeping mechanism may be remotely controlled by an operator or maneuvered using an artificial intelligence ("AI") computer program. The laser transfers the energy from the laser beam to the debris and evaporates or otherwise removes them, leaving the surface clean.

Another embodiment includes a tool for doing minor repairs. The repair mechanism comprises a mechanical robotic arm attached to the rover that operates to move a tool across the surface of the airfoil, such as a sander, paint gun, camera, or the like. The robotic arm may also controlled to deposit liquid filler or coating (such as epoxy, polyurethane or an alternative) on damaged surfaces and/or pitted surfaces of the airfoil. The robotic arm may also have an interchangeable end attachment to spread liquid and sand/abrade small surface areas.

Yet a third tool may comprise a mechanism for protecting the leading edge of the turbine airfoil with paint (e.g., and extendable sponge, liquid deposition nozzle or spray device). The mechanism for depositing and applying a protective liquid coating uses a pressurized liquid spray or fixed standoff liquid flooded shoe/cavity to produce a uniform thickness coating over the curved profile and span/distance. The deposited protection coating material is allowed to cure using a chemical reaction and/or a UV initiated curing by sunlight or electronic UV emitter device.

Another tool that can be attached to the rover is a unique tape/film applicator comprising a mechanical motorized shuttling device loaded with pre rolled protective tape/film material on a drum. The tape/film may include an adhesive attachment surface protected by a nonstick removable backing. The tape/film applicator may alternatively include a pressurized spray head that dispenses an adhesion promoting liquid to the surface of the airfoil ahead of tape/film deposit. As the tape applicator moves along the airfoil, it removes the protective tape backing and mechanically deposits the film onto the surface via rollers and a squeegee type tail to smooth the film, removing any entrapped air and/or extra liquid in the process. In some embodiments, the system relies upon manual inputs and uses cameras to relay information to a remote operator. In other embodiments, the system operates entirely autonomously, using telemetry, artificial intelligence, and streaming information to a command center.

Another tool in the form of an oscillating mechanism mounted to a robotic arm or gantry causes a sanding or brushing drum to rotate over the surface contour to remove material in preparation for surface coating with paint or tape. The oscillating mechanism is remotely controlled by an operator or an AI computer program. The drum's outer surface may have abrasive bristles or sandpaper flaps that are passed over the airfoil to remove surface dirt and/or smooth any protruding repair filler. In some cases, the surface is chemically cleaned/treated via a sprayed solvent to remove unwanted contaminants prior to and/or after sanding/abrading the airfoil surface.

In yet another embodiment, an attachment may comprise a robotic arm that performs a tape laying procedure or a paint/print procedure where vortex generator tape (VGT) or paintable/printable UV curable material are attached to the surface of the airfoil at a airfoil location selected to maximize lift and minimize drag. A variation of this tool attaches individual vortex generators correctly spaced and positioned on the surface of the airfoil.

In another embodiment, a mechanical arm or other mechanism is used for in-situ filling of cracks or any other types of damages. Moreover, at least one visual device (optical or thermal camera) is mounted on the rover, to inspect the airfoil's surface for any surface damages. Using AI technology, the rover may detect different types of damages, and assist the computer or service tech to make decisions and perform remedial actions.

While a system has been described for use with wind turbines, the present invention may be used for other uses, including aircraft wings, helicopter airfoils, fixed wing drones, etc. These and other features of the invention will best be understood with reference to the Detailed Description of the Preferred Embodiments along with the accompanying drawings listed below.

BRIEF DESCRIPTION OF THE DRAWINGS

FIG. 3 is an elevated, perspective view of an alternate embodiment with a robotic arm attached;

DETAILED DESCRIPTION OF THE PREFERRED EMBODIMENTS

Although various embodiments are described herein, it is to be understood that different embodiments can share common features/tools/structures even if the embodiments are not specifically shown in that manner. In other words, one embodiment may show a tape applicator whereas another embodiment may show a paint sprayer, and it is to be understood that other embodiments may include both tools or some other combination, and each combination is properly deemed to be within the scope of the present invention.

Figure 1:
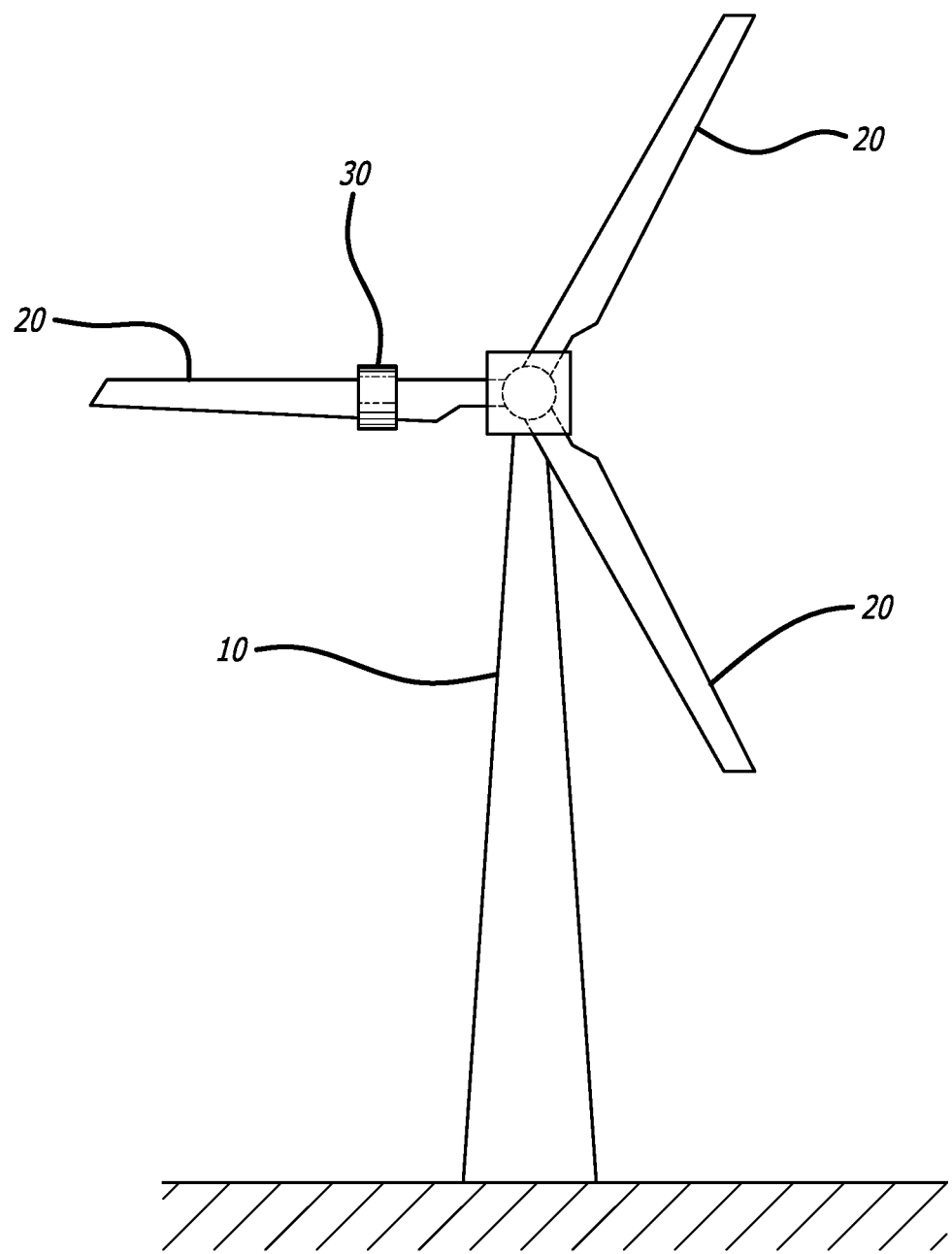
FIG. 1 is a front view of a wind turbine with the present invention shown attached to a horizontal airfoil.

FIG. 1 illustrates an embodiment of present invention 30 situated on a horizontal axis wind turbine ("HAWT") 10 that is found in many energy farms around the country. Horizontal axis wind turbines 10 use multiple airfoils 20 that are aerodynamically shaped like airplane wings that are rotated by the wind to generate electricity. The number of airfoils used for electric power generation typically varies depending upon the conditions, where the number of airfoils involves a compromise between the power coefficient, the cost, and the speed of rotation of the wind sensor. HAWTs tend to be less expensive and less exposed to mechanical stresses when compared with the vertical axes turbines, and the position of the receiver at several tens of meters off the ground favors the efficiency. With either type of turbine, however, prolonged use can lead to the airfoils incurring damage and wear, pitting, cracks, accumulating dirt, debris, and various other occurrences that can lower the efficiency of the HAWT. Thus, it requires that the airfoils 20 be serviced in some manner on a regular basis.

A robotic rover 30 is shown resting on an upper edge of a horizontally aligned airfoil 20. When one airfoil of the three airfoil turbine is located horizontally, the other two airfoils are oriented at oblique angles (120° and −120°, respectively) so the turbine 10 must be advanced for each service so that the airfoil to be serviced is horizontal. This horizontal orientation allows the rover 30 sit on top of the airfoil 20 and utilize gravity as a positive positioning force to supplement a gripping system. The rover 30 includes a motorized roller system (using wheels, tread, etc.) to move the rover 30 horizontally along the upper edge of the airfoil 20.

FIG. 2A-D illustrate a first embodiment of a rover 30 for use in servicing a horizontal airfoil 20, comprising a light weight housing 32 that is shaped to ride longitudinally down an airfoil and enclose a leading edge, approximating a portion of an elliptical arch as shown. A pair of wheels 42 are mounted to each side of the housing 32 and the wheels are mounted so that they are capable of maintaining a flush contact with the varying surface contours of the airfoil 20 as the rover 30 moves along the airfoil. The four wheels 42 may be connected to a motorized drive system that allows the rover 30 to move along the surface of the airfoil and to be controlled by a user remotely. The wheels 42 preferably have a high friction surface such as rubber, urethane, or other tacky but soft material that allows the wheels 42 to grip the surface of the airfoil 20 and move the rover 30 without slip along the horizontally situated airfoil and without scratching or damaging the surface of the airfoil. The wheels 42 could also be replaced with a track/belt, or other propulsion system (not shown) to move the rover 30 along the upper edge of the airfoil without departing from the invention.

The rover 30 also includes a rear stabilizer 52 comprising pair of rear rollers 53 whose position are controlled by a servo motor 55 to apply pressure to the lower surface of the trailing edge of the airfoil 20 as the rover moves across the airfoil. A front stabilizer 48 having an omniball 49 or other device attached to a lever arm 47 applies a force to the lower surface of the leading edge of the airfoil, and the front stabilizer 48 and the rear stabilizer 52 can be coordinated to properly balance and stabilize the rover 30 on the airfoil 20 in real time. Using AI or other control logic, the front and rear stabilizers can compensate for any shift in the rover by applying more or less force to the respective lower surfaces to balance the rover on the upper surface of the airfoil. A force sensor 58 can be located at the leading edge such that the airfoil bears against the force sensor 58, and the sensor can send a signal to the rover processor to adjust the front and rear stabilizers in order to improve the balance.

Figure 2A:
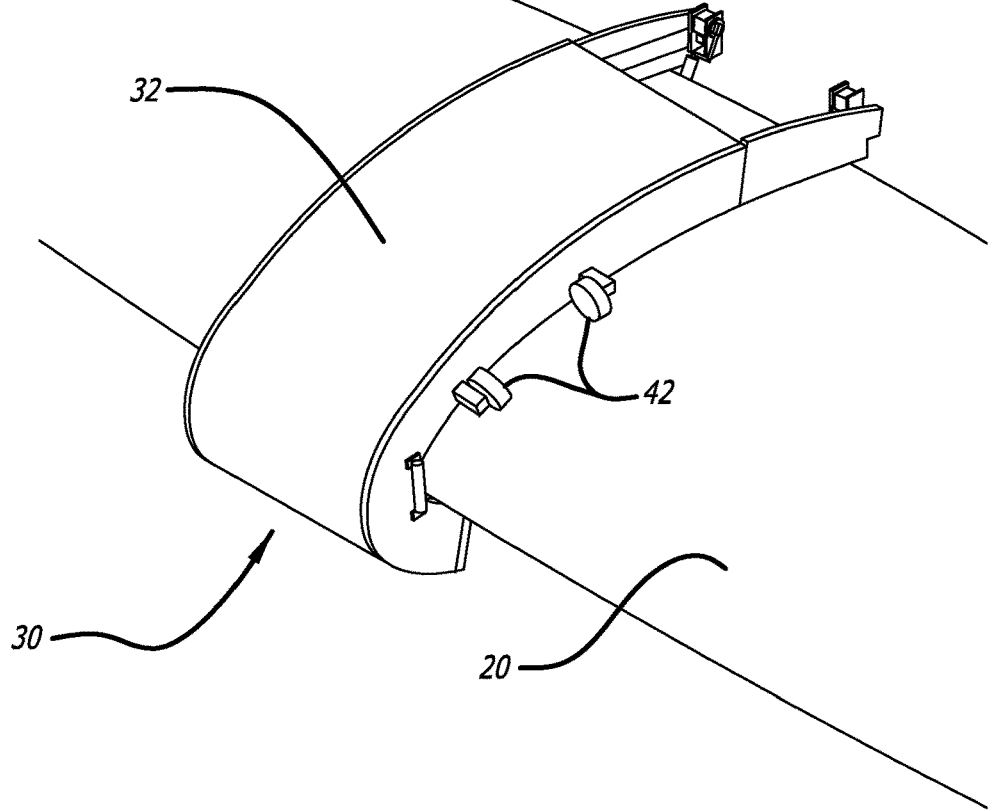
FIG. 2A is an elevated, perspective view of the embodiment of FIG. 2 on the airfoil.
Figure 2B:
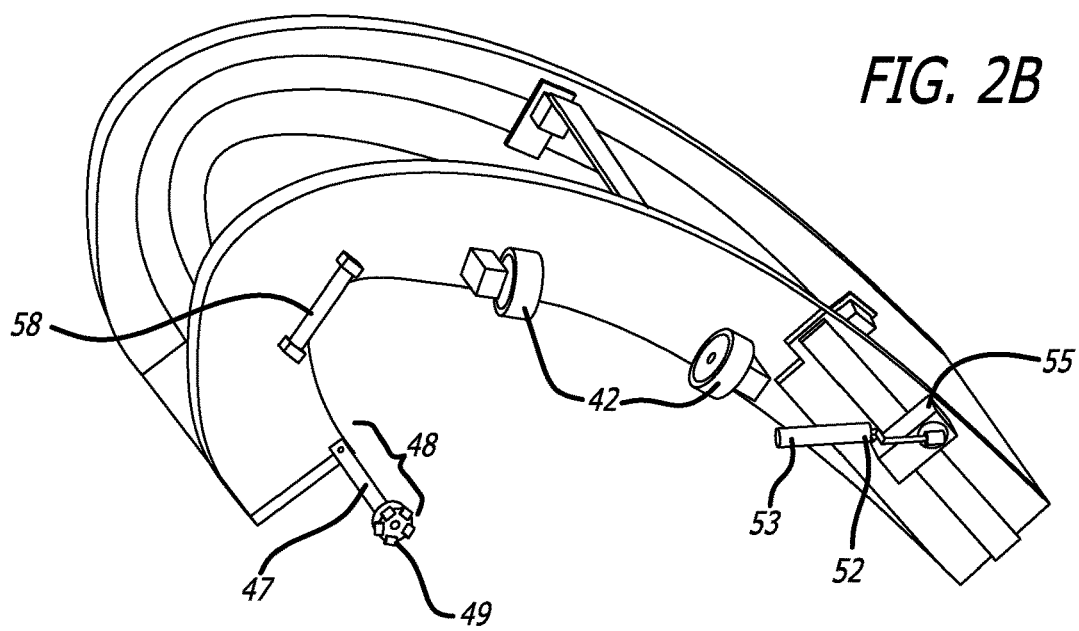
FIG. 2B is an elevated, perspective view of the embodiment of FIG. 2 without a cover and without an airfoil.
Figure 2C:
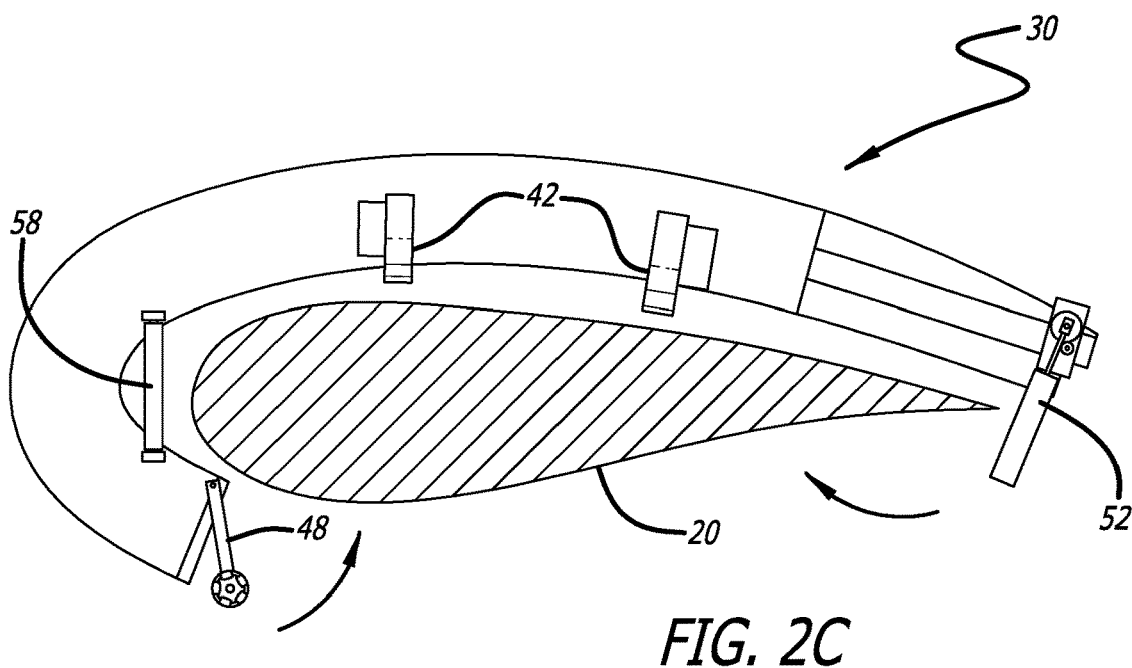
FIG. 2C is a cross sectional view of the embodiment of FIG. 2 on the airfoil.
Figure 2D:
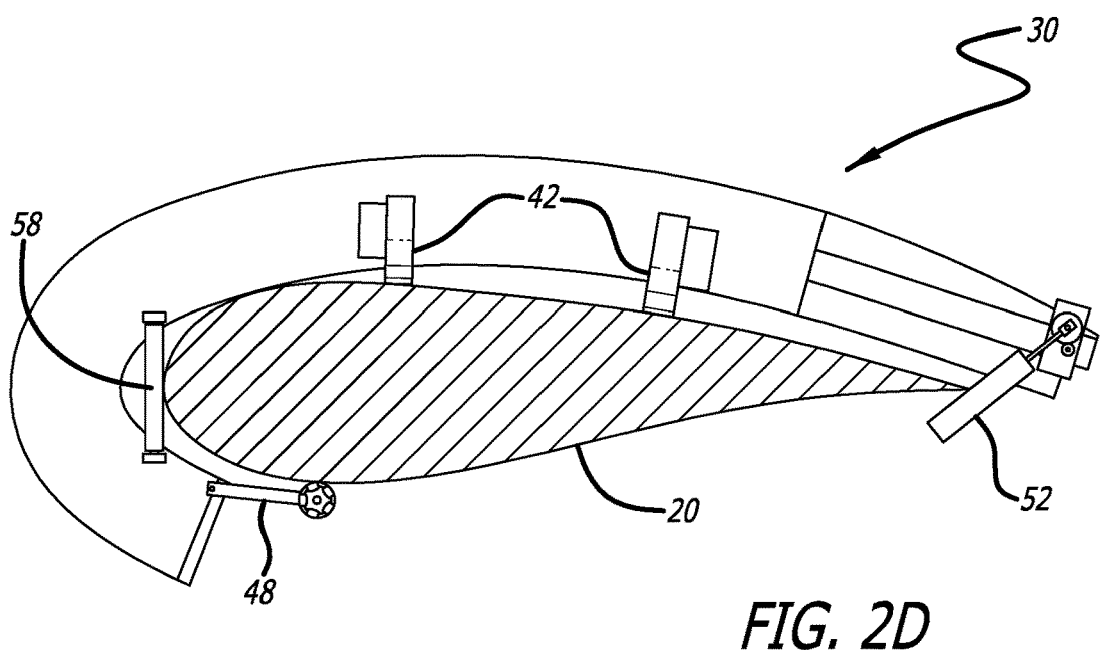
FIG. 2D is a cross sectional view of the embodiment of FIG. 2 with the fore and aft stabilizers engaged.

FIGS. 2C and 2D illustrate the operation of the front and rear stabilizers. In FIG. 2C, the rover 30 is situated on the airfoil 20 with the leading edge of the airfoil bearing against the force sensor 58, which sends signal to the processor that the airfoil is pushing against the rover. The front stabilizer 48 and rear stabilizer 52 are rotated to an open or disengaged position in FIG. 2C. In FIG. 2D, The front stabilizer 48 has rotated such that the omniball 49 is brought in contact with the lower surface of the leading edge, and the roller 53 is brought into contact with the lower surface of the trailing edge of the airfoil. In this manner, with constant feedback and adjustment using the force sensor 58, the rover 30 can remain balanced on the airfoil even in windy or inclement conditions.

Figure 4:
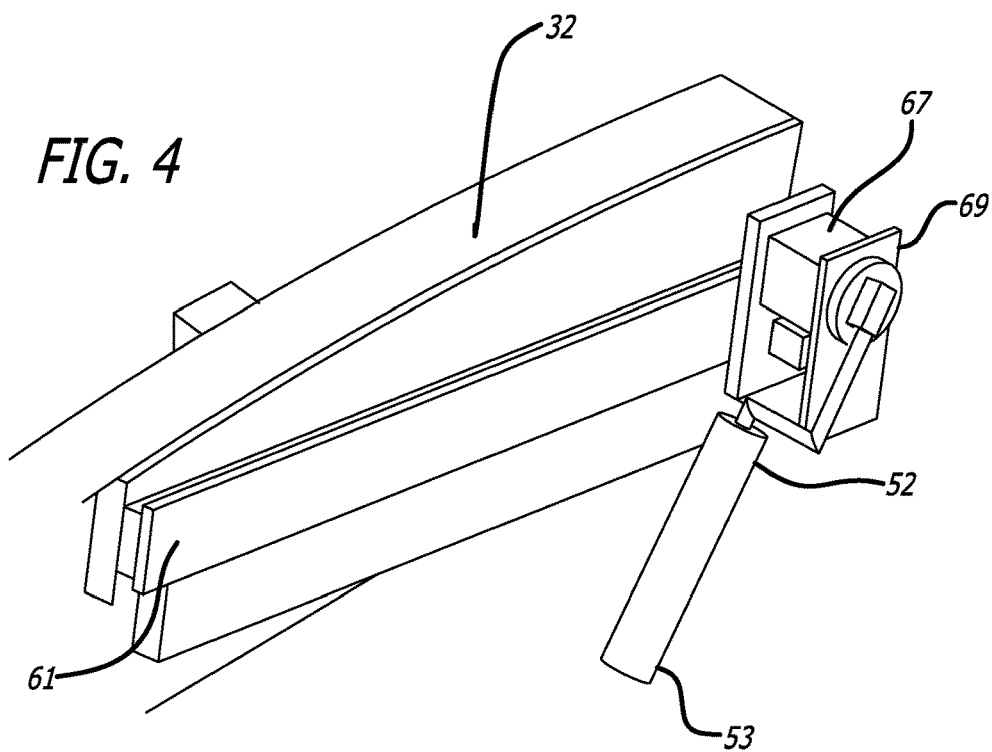
FIG. 4 is an enlarged perspective view of an aft stabilizer of the embodiment of FIG. 2.

FIG. 4 illustrates the rollers 53 of the rear stabilizer 52, which can be moved along a track 61 using a gear system (not shown). The rollers 53 may be foam or other soft material to protect the surface of the airfoil, and the position of the rollers 53 are controlled in a first embodiment by a motor or other mechanism. The stabilizers 52 may move along the track 61 on inner frames of the housing 32 to position the stabilizers 52 in the location to best support the rover 30. In a first embodiment, a motor assembly 67 drives the carriage 69 along the inner track 61 based on signals from a controller, and the stabilizers 52 cooperate with the stabilizers 48 to maintain a level and even orientation of the rover on the airfoil.

Figure 5:
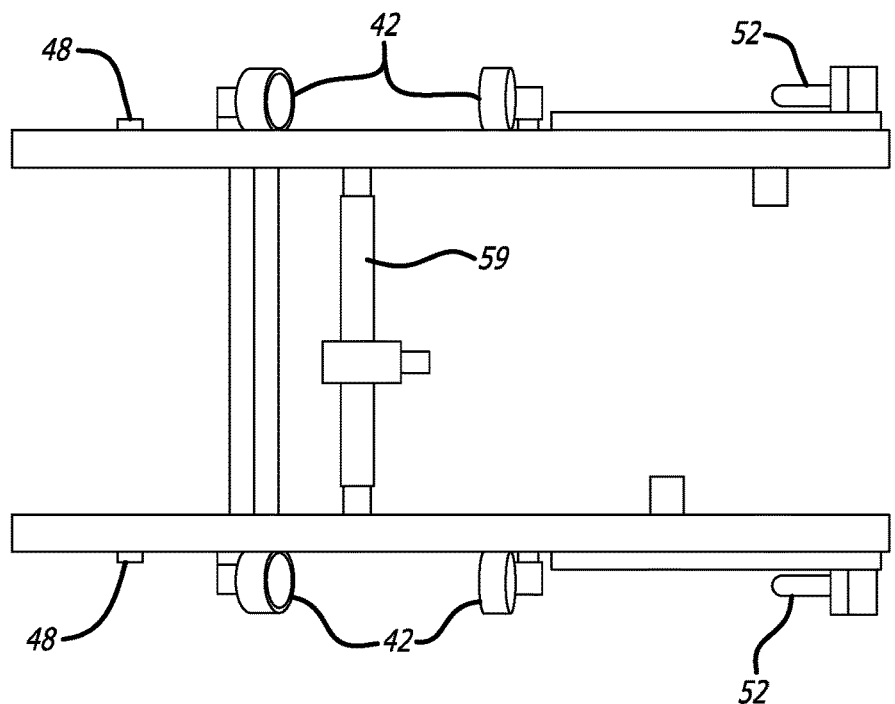
FIG. 5 is a top view of the embodiment of FIG. 2 without a cover.

FIG. 5 illustrates a top view of an embodiment of the rover 30. The wheels 42 are illustrated, as are the stabilizers 52 and their carriages 69. A gantry 59 spans the rover's frame and can move fore and aft using a drive system (not shown). The gantry 59 can support a variety of tools to service the airfoil 20 of the turbine 10 as the rover 30 moves along the surface, as explained in more detail below.

Figure 6:
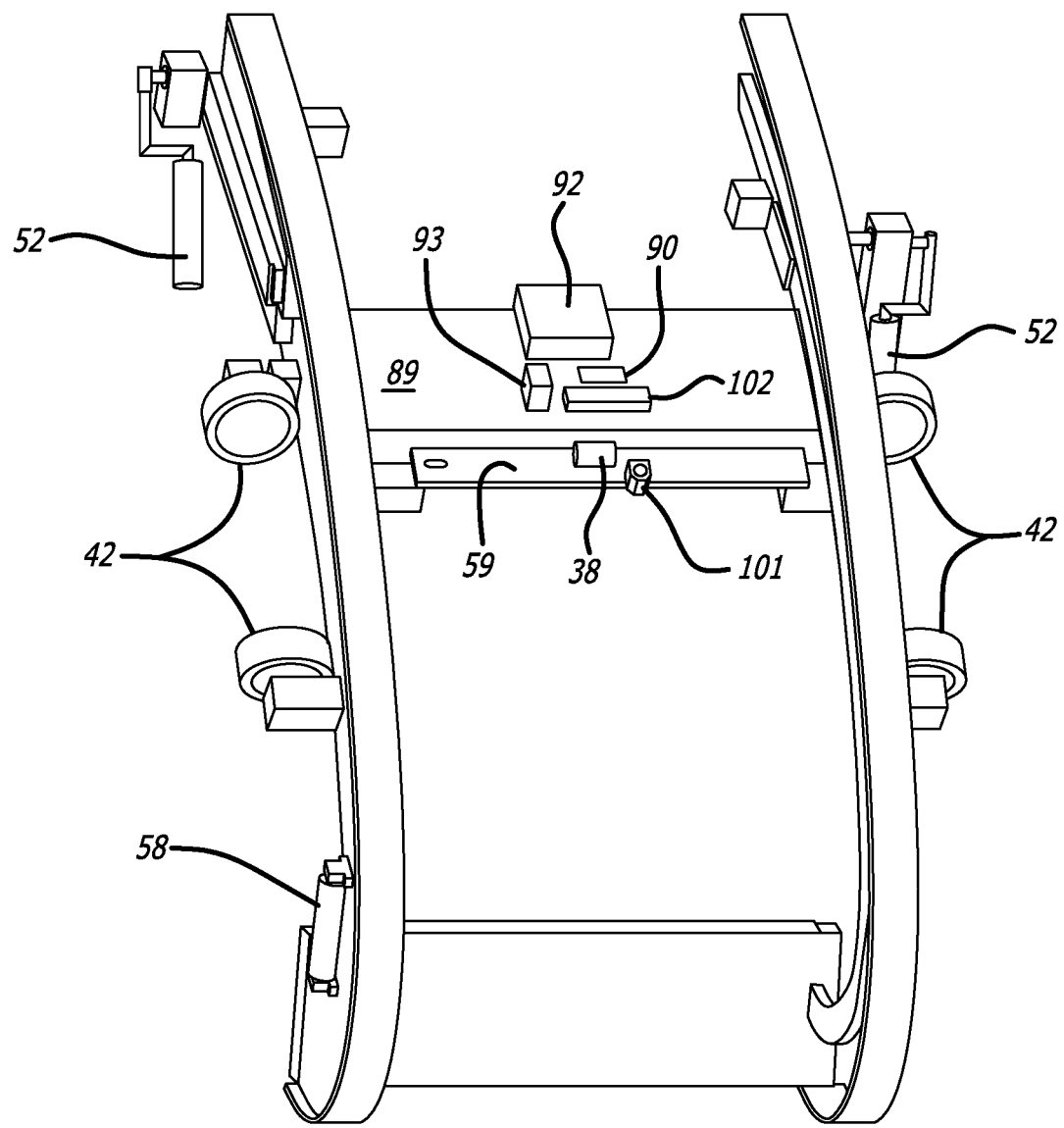
FIG. 6 is an elevated, perspective view of another embodiment of the invention with the cover removed.

FIG. 6 illustrates an embodiment of the rover 30 having a laser optic device 101 cooperating with a laser module 102 that can be used to clean or polish the surface of the airfoil. The gantry 59 moves back and forth to allow the laser optic 101 to pass over the surface of the airfoil as the rover moves longitudinally along the airfoil. A camera 38 such as an IR camera (FLIR) or thermal camera may also be located on the gantry 59 to inspect the airfoil as it is being serviced. The camera 38 can send images or video either to a control module 90 or directly to a remote user using wireless radio frequency (RF) module or other data transfer technology. The control module 90, such as an AI controller, is mounted to a platform 89, which also supports a power supply 92 and a heat sink 93.

Figure 7:
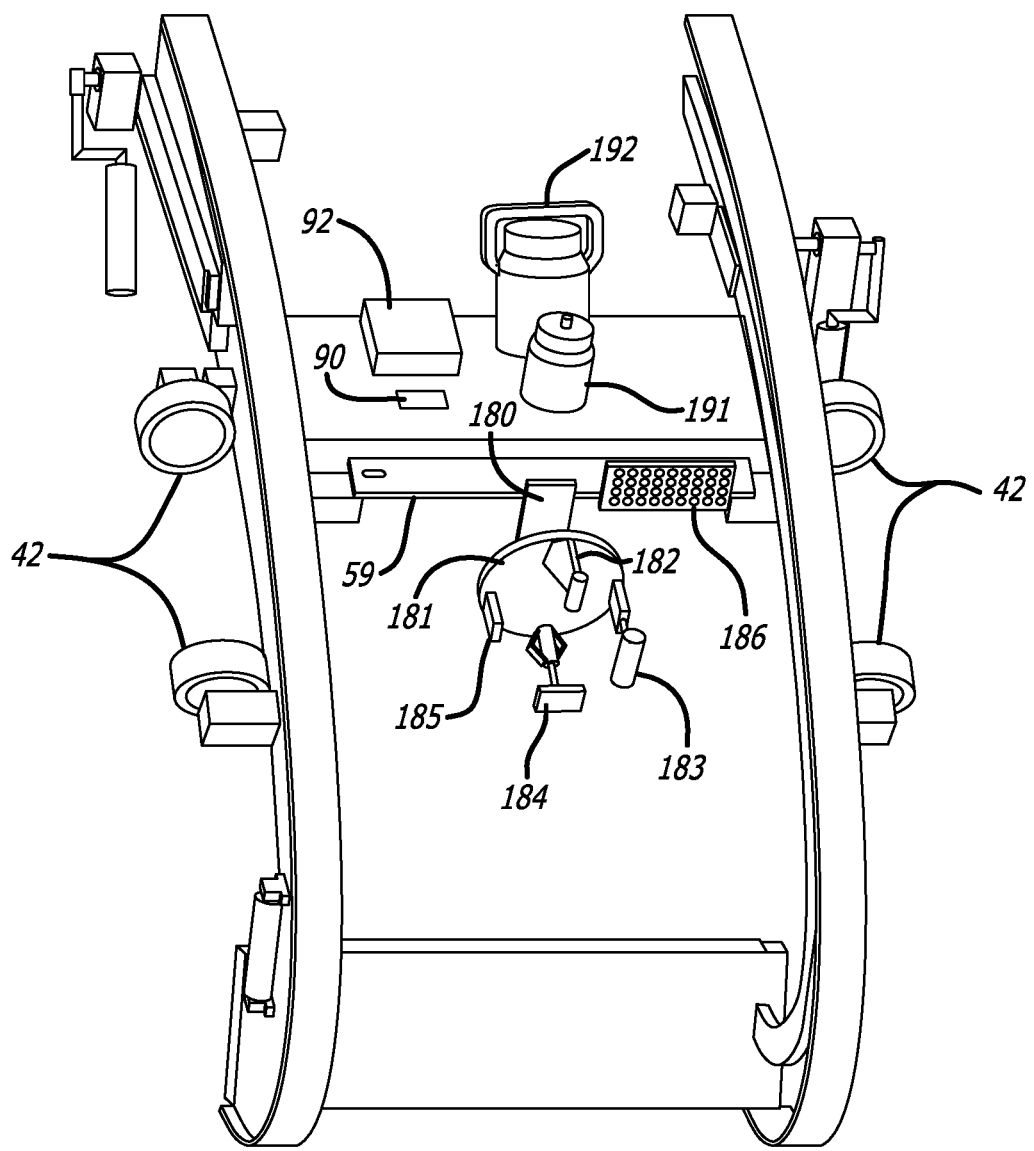
FIG. 7 is an elevated, perspective view of another embodiment of the invention with the cover removed.

FIG. 7 illustrates another embodiment of the present invention, where the laser optic 101 has been replaced with a multi-function rotating tool 180. The multi-function tool 180 includes a circular disk 181 that has mounted on its periphery an electric HVLP spray gun 182, a paint roller 183, a sponge 184 for smoothing coatings such as paint, and a sanding/abrading tool 185. The various tools 182-185 can be rotating into position using a motor mounted on the gantry 59 to allow the rover to perform multiple functions while moving along the wind turbine airfoil. A UV cure lamp 186 may be placed in proximity with the rotating tool 180 to allow curing of a coating or paint applied to the surface. On the platform 89 adjacent the controller 90 and the power supply 92 is a paint supply canister 191 and paint reservoir 192 that feed paint to the spray gun 182 as needed.

Figure 8:
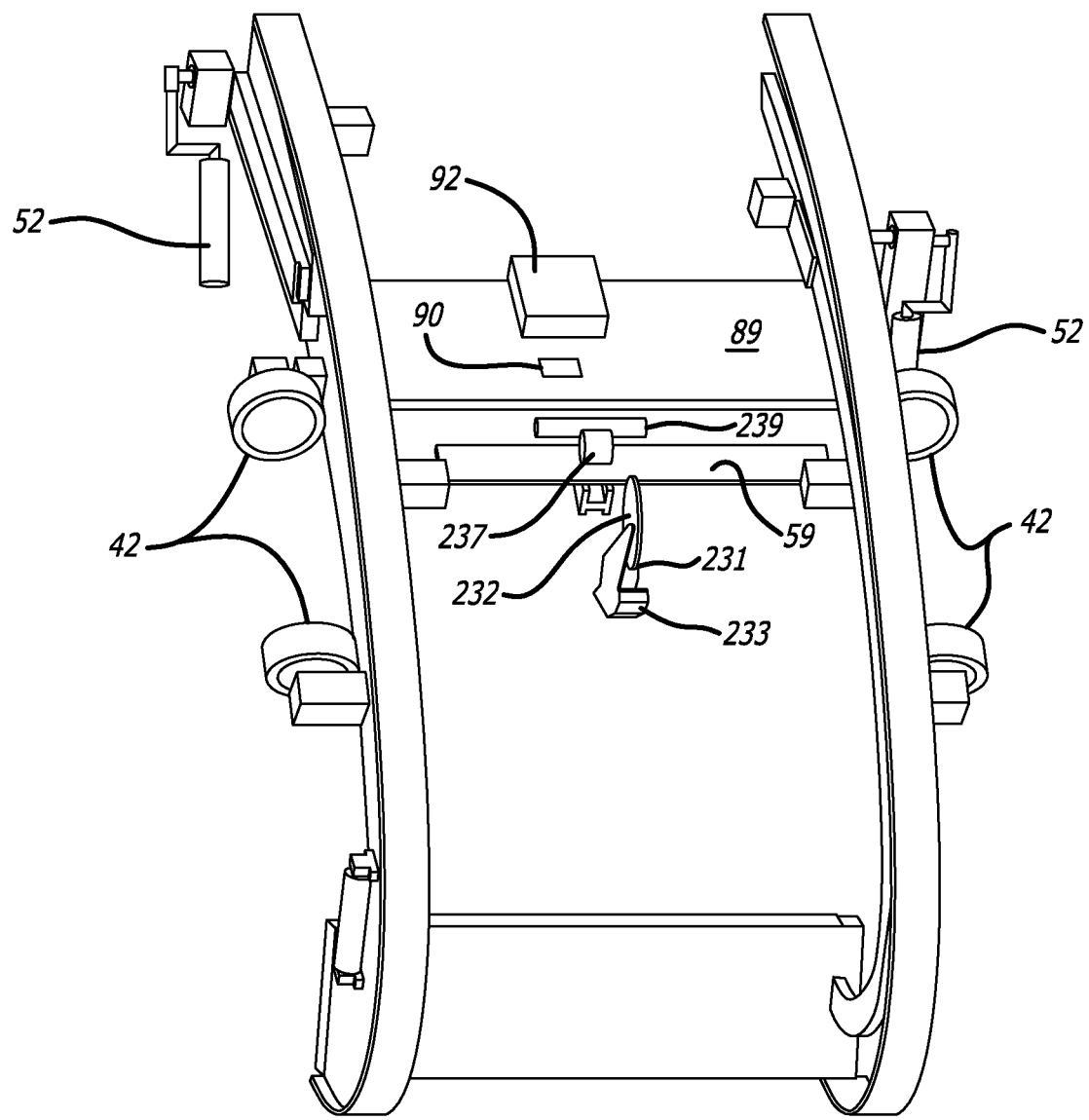
FIG. 8 is an elevated, perspective view of another embodiment of the invention with the cover removed.

FIG. 8 shows another embodiment where the multi-function tool has been replaced with a tape applicator 231 having a roll of tape/film 232 that can be separated from its protective backing and collected in the collector 233. A spray head may be provided to pretreat the surface of the airfoil 20 with an adhesive spray to apply the tape, and the gantry 59 can include an oscillating mechanism 237 that vibrates a roller 239 with abrasive bristles or sandpaper flaps to clean and abrade the surface of the airfoil prior to application of the tape, which may be used to control the airflow over the airfoil as the wind turbine rotates.

The control system of the rover preferably includes a data exchange/communication system as part of the controller 90 for communicating with a remote user or computer. Commands from either an AI system stored on the controller 90 or sent to the controller by a remote computer via the communication device, instructs the rover 30 to operate the various motors, utilities, and tools situated thereon. The communication system may receive signals from the remote computer, which may be a smart phone, tablet, handheld computer, or desktop computer, and perform operations, sending signals, status, warnings, or other data to a remote receiver regarding the operation and performance of the rover 30. The controller 90 controls the motors that drive the wheels 42 to propel the rover along the airfoil while the various operations (e.g., sanding, spraying, cleaning, etc.) are performed on the surface of the airfoil. The controller 90 also controls the camera or optical device 38 that takes and transmits images or video of the airfoil and sends images or video to a user control or a remote receiver/computing device for evaluation and testing, along with sensor readings such as rover velocity, laser power, wind speed, temperature of the AI system.

Figure 9:
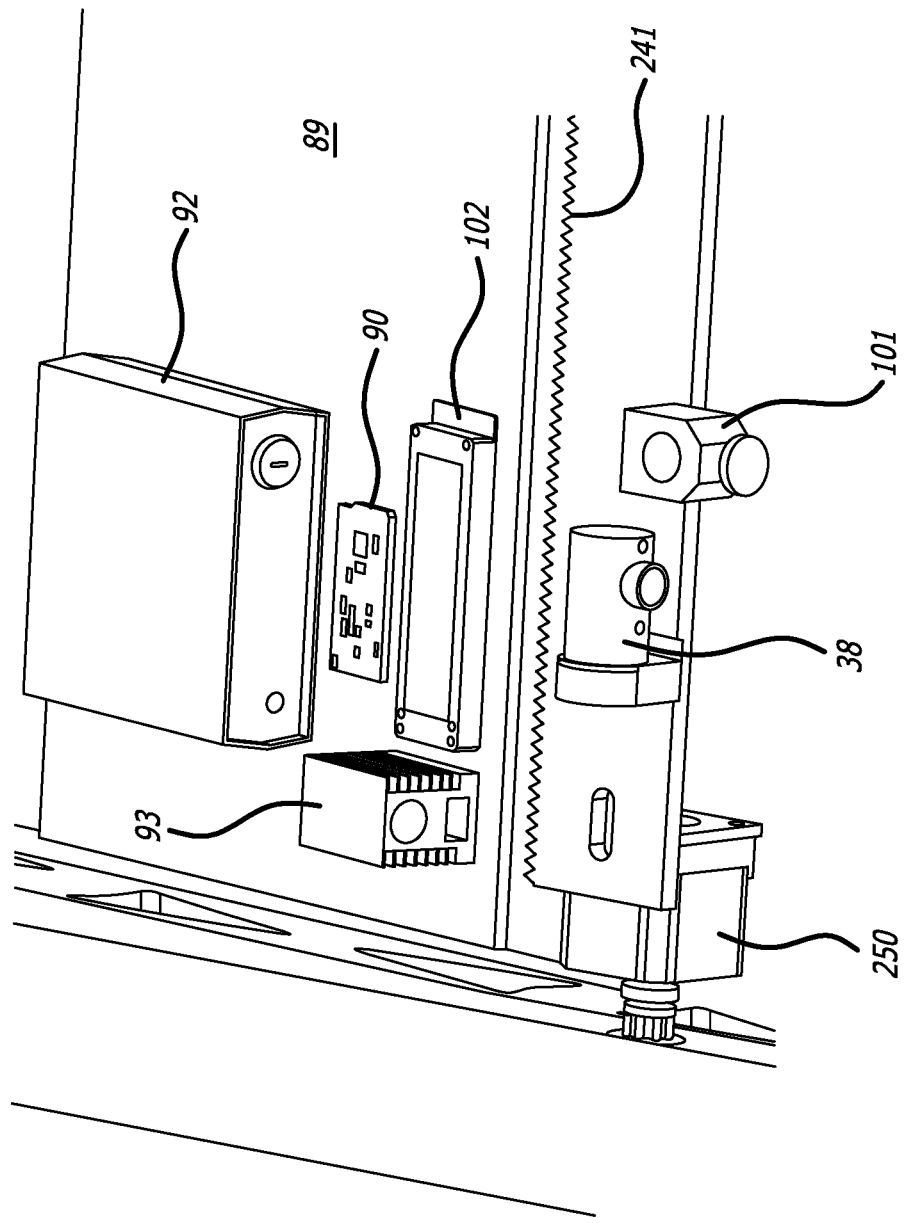
FIG. 9 is an elevated, perspective view of the control system of the embodiment of FIG. 6.
Figure 10:
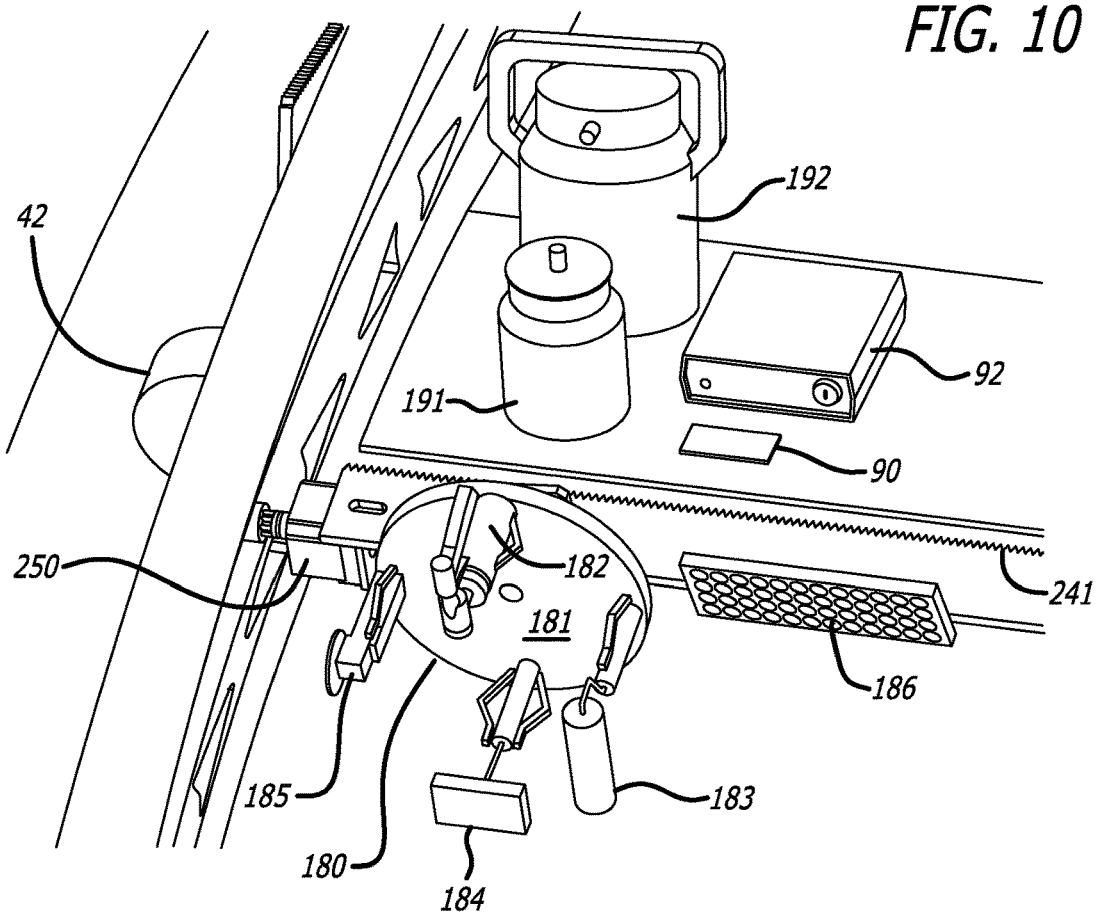
FIG. 10 is an elevated, perspective view of the control system of the embodiment of FIG. 7.
Figure 11:
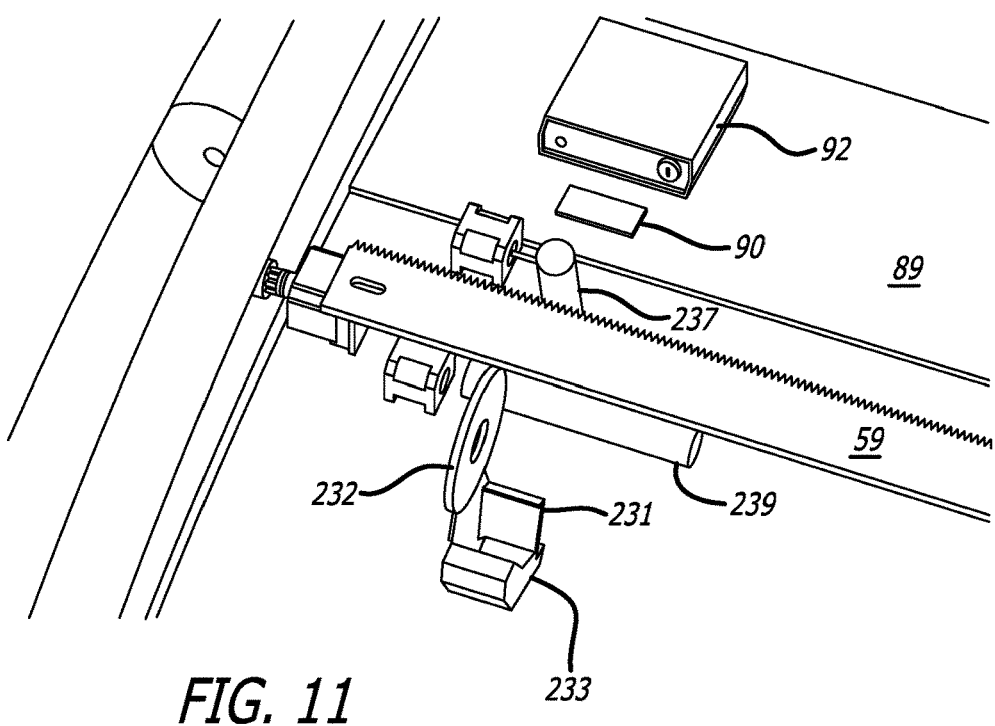
FIG. 11 is an elevated, perspective view of the control system of the embodiment of FIG. 8.

FIG. 9 illustrates the various tools and control system of the embodiment of FIG. 6, including the laser 101, camera 38, and gantry positioning system 250. Gantry 59 can be seen with a sawtooth edge 241 that can be used to create a sawtooth pattern on the surface of the airfoil using the various tools, including the paint sprayer. It has been found that the sawtooth pattern can promote better airflow characteristics for improving the efficiency of the wind turbine. FIG. 10 illustrates the various tools and control system of the embodiment of FIG. 7, and FIG. 11 illustrates the various tools and control system of the embodiment of FIG. 8.

As stated above, the rover 30 may be controlled by an operator located on site via remote real time streaming video camera assisted by visual contact with the rover. All processes are monitored by the operator and also monitored by a camera mounted on each tool as the work is being done. This provides real time streaming video and via machine vision software, allows for immediate corrections as needed. The operator centric system is completely automated and controlled from a command center, and electrical sensors are mounted to rover to monitor and read the rover's motion and position, and actions are either controlled or taken autonomously.

Figure 12:
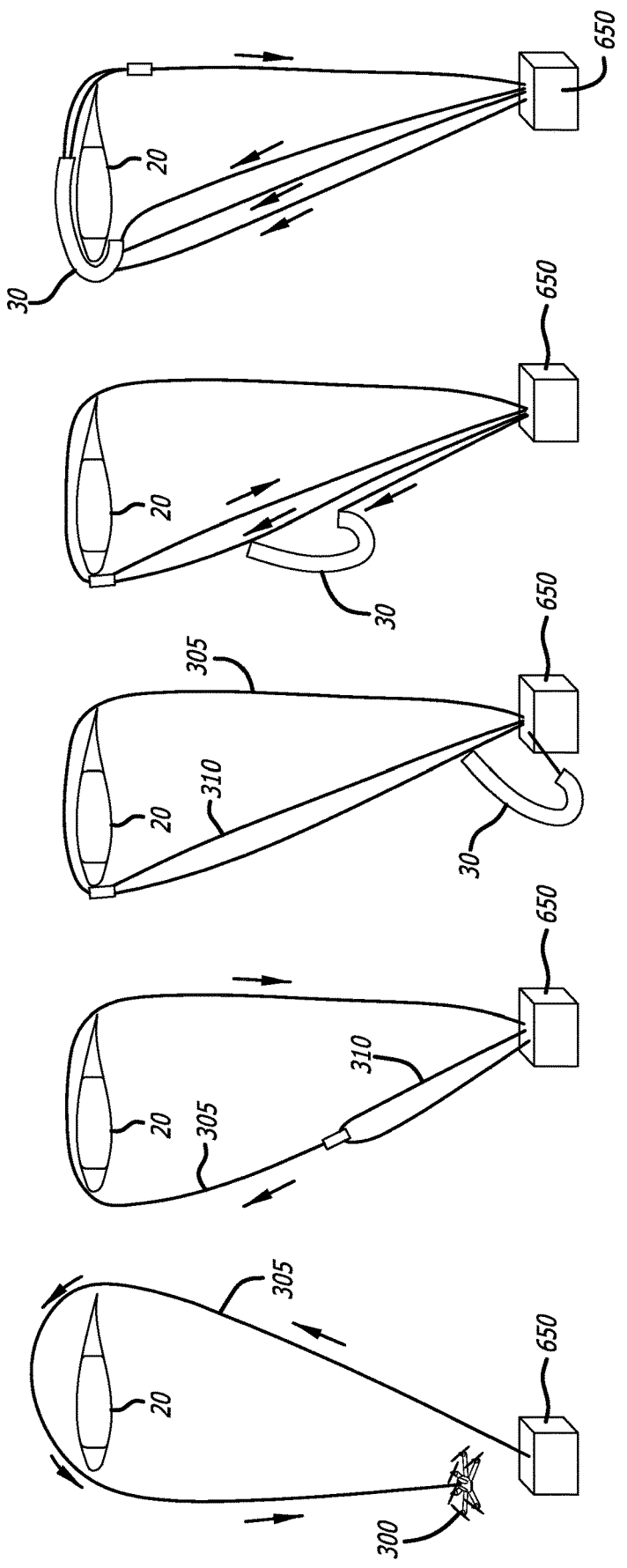
FIG. 12A-E is a deployment sequence depiction of the present invention.

FIG. 12 illustrates a deployment strategy for locating the rover 30 onto the horizontally disposed airfoil 20 of the turbine. In FIG. 12A, a drone 300 having a cable 305 is flown over the airfoil 20 and a free end is attached to a winch 650. In FIG. 12B, a second cable 310 is brought to the leading edge of the airfoil and the rover 30 is attached to cable 310 in FIG. 12C. The winch 650 is activated to wind the cable 305, lifting the rover 30 up toward the airfoil 20 in FIG. 12D. As the rover passes the top of the airfoil in FIG. 12E, the cables are tightened to secure the rover 30 on top of the airfoil 20. The robotic system may be tethered to the turbine airfoil 20 using an electro mechanical rotary device to ensure correct tension and torque as the rover moves across the turbine airfoil while the girth of the airfoil varies. In a preferred embodiment, the tether is fitted with a quick release mechanism in case of emergencies.

The foregoing describes an autonomous or semi-autonomous system for inspection, cleaning, and laying tape or painting on wind turbine (airfoil) structures. The system consists of a main rover, and for each task there is a separate tool that is attached to the rover or multiple rovers. The rover is deployed on the designated airfoil by cable that allows a rapid and simple deployment without expensive equipment. Tools such as sanders, tape applicators, and others are attached to the rover and service the turbine as it moves along the surface. A feature of this system is that the rover runs on the top surface, which doesn't requires strong adhesion technology.

Figure 13:
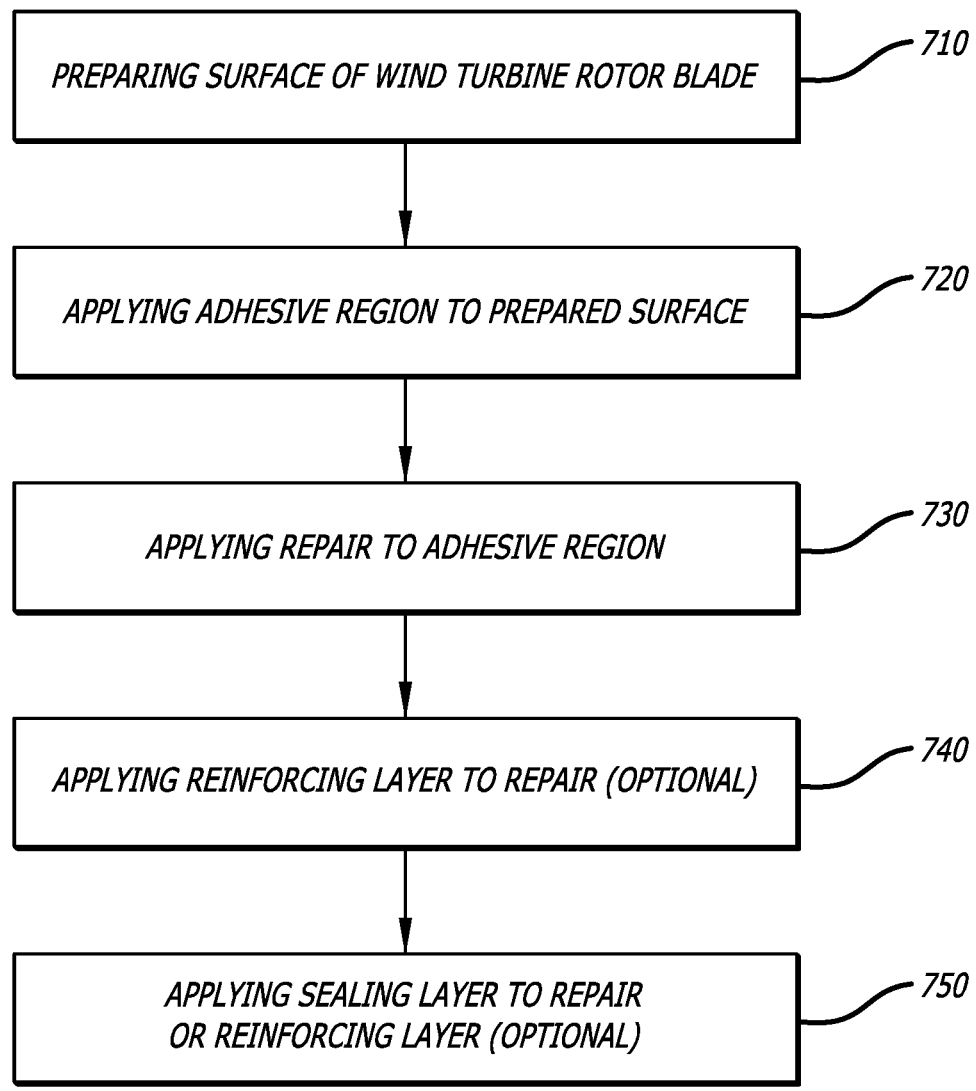
FIG. 13 is a flow diagram for a method of using the present invention.

FIG. 13 illustrates a method for treating or servicing a wind turbine airfoil using a rover of the present invention. The rover is deployed on the wind turbine airfoil as shown in FIG. 12, and the rover is sent a signal to initiate the motor to move the rover along the upper surface of the airfoil. A signal may also be sent to the controller inside the rover in step 710 to activate a motor that rotates a brush that cleans the surface of the airfoil as the rover moves along the airfoil. A second tool unpeels a spool of tape by separating the tape from its protective, non-adhesive backing so that the tape can be applied to the surface of the airfoil in step 720. A spray or injection device is used to fill any cracks, pits, or other imperfections in the surface of the airfoil in step 730, and another spray, sponge, or applicator can be used to apply a paint or other protective coating in step 740. In step 750, a sealing layer to repair or reinforce the airfoil is applied in the final step as the rover passes along the airfoil. Other steps can be to initiate the oscillator and brush/roller to clean the surface of the airfoil, activate the laser to scan and remove debris from the surface, and activate the spray paint gun to apply a surface coating to the airfoil. These steps can take place over multiple passes or a single pass, depending upon the needs of the operation.

FIG. 3 depicts an alternate embodiment wherein the rover 30 includes a robotic arm 400 that is controlled by the processor 90 and can access and operate one or more tools described above, such as a sander, paint gun, laser, repair tool, etc. The robotic arm 400 can While the inventors' best mode and preferred embodiments have been described herein, the invention is not limited to the foregoing descriptions or depictions. Rather, a person skilled in the art would readily appreciate many modifications and substitutions, and the invention is intended to include all such modifications and substitutions. Accordingly, unless expressly limited herein, the scope of the invention is properly determined by the words in the claims, given their ordinary and plain meanings.

We claim:

1. An autonomous airfoil surface treatment system, comprising:
   a rover having a housing including an elliptical arch and a plurality of wheels and a plurality of rollers having axes of rotation that are non-parallel to an axis of rotation of the wheels;
   a motor coupled to the plurality of rollers for controlling a position of the rollers;
   a force sensor configured to measure a force on the rover by a leading edge of an airfoil;
   a controller connected to the motor, said controller configured to adjust the motor based on signals received by the force sensor to maintain the rover level;
   a camera; and
   at least one airfoil surface treatment tool.

2. The autonomous airfoil surface treatment system of claim 1, wherein the at least one airfoil surface treatment tool includes a tape applicator for applying a tape to the airfoil surface.

3. The autonomous airfoil surface treatment system of claim 1, wherein the at least one airfoil surface treatment tool includes a paint applicator for applying paint to the airfoil surface.

4. The autonomous airfoil surface treatment system of claim 1, wherein the at least one airfoil surface treatment tool includes a laser for applying laser energy to the airfoil surface.

5. The autonomous airfoil surface treatment system of claim 1, wherein the at least one airfoil surface treatment tool includes a roller to clean the airfoil surface.

6. The autonomous airfoil surface treatment system of claim 1, wherein the rover is connected to a cable that applies a tension to control the rover.

7. The autonomous airfoil surface treatment system of claim 1, wherein the rover includes a gantry, where a tool is mounted on the gantry and a position of the tool is controlled as the rover moves along the airfoil surface.

8. The autonomous airfoil surface treatment system of claim 1, wherein the controller uses artificial intelligence (AI) to manage the operation of the rover.

9. The autonomous airfoil surface treatment system of claim 1, further comprising a UV curing panel.

10. The autonomous airfoil surface treatment system of claim 1, further comprising a rotatable disk having multiple tools situated thereon, whereby the disk is rotatable to locate a specific tool adjacent the airfoil surface.

11. A method for treating a surface of an airfoil, comprising:
    extending the airfoil to a horizontal position;
    providing the autonomous airfoil surface treatment system of claim 1;
    locating the rover on the airfoil at an upper edge;
    commanding the rover to move along the airfoil's surface using a drive system;
    activating a spray tool to apply a coating to the surface of the airfoil; and
    removing the autonomous rover from the airfoil.

12. The method for treating a surface of an airfoil of claim 11, further comprising a step of applying a tape to the airfoil surface using the rover as the rover moves along the airfoil.

13. The method for treating a surface of an airfoil of claim 11, further comprising a step of using the camera on the rover to acquire images of the airfoil surface and transmit the images to a remote location.

14. The method for treating a surface of an airfoil of claim 11, wherein the coating is applied to repair the airfoil surface.

15. The method for treating a surface of an airfoil of claim 11, further comprising applying an abrasive surface to the airfoil to clean the airfoil.

16. The method for treating a surface of an airfoil of claim 11, further comprising providing a laser on the rover and using the laser to apply energy from the laser to the airfoil surface.

* * * * *